W. TERNESON.
Army Plate.
No. 41,652.            Patented Feb. 16, 1864.
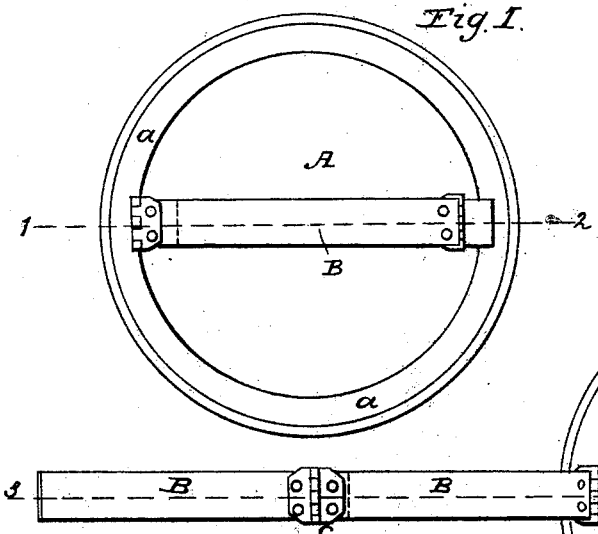
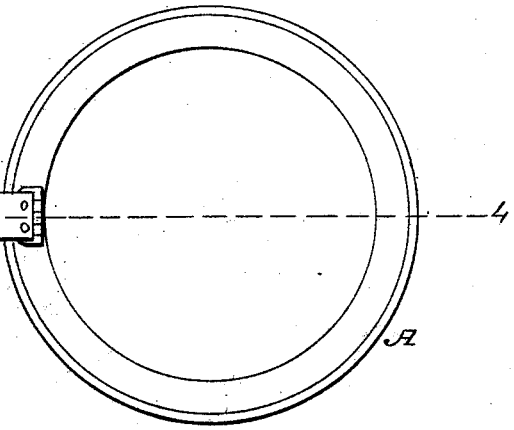
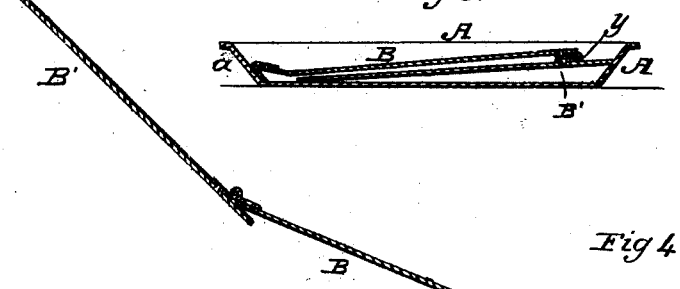
Witnesses:
Chas E Foster
Charle Howen
Inventor:
Harry Howdon
Atty for
Wm Terneson

UNITED STATES PATENT OFFICE.

WILLIAM TERNESON, OF PHILADELPHIA, PENNSYLVANIA.

IMPROVEMENT IN ARMY-PLATES.

Specification forming part of Letters Patent No. 41,652, dated February 16, 1864.

*To all whom it may concern:*

Be it known that I, WILLIAM TERNESON, of Philadelphia, Pennsylvania, have invented a Combined Plate and Frying-Pan; and I do hereby declare the following to be a full, clear, and exact description of the same, reference being had to the accompanying drawings, and to the letters of reference marked thereon.

My invention consists of a metal pan or plate and two strips of metal so hinged to each other and to the said plate that when the strips are folded down within the rim of the pan the whole shall occupy no more space than an ordinary army-plate, and when the strips are folded out they shall form a handle, by means of which the plate can be held over the fire and removed from the same without inconvenience, a frying-pan and a plate of a character especially adapted to army uses being thus combined in one utensil.

In order to enable others to make my invention, I will now proceed to describe the manner of constructing the same.

On reference to the accompanying drawings, which form a part of this specification, Figures 1 and 2 are plan views of my combined plate and frying-pan; Fig. 3, a section on the line 1 2, Fig. 1; and Fig. 4, a section on the line 3 4, Fig. 2.

Similar letters refer to similar parts throughout the several views.

A is a metal plate or pan having the rim $a$, and being similar to those generally used in the army. To the inside of this rim $a$ is jointed one end of a metal strip, B, the other end of the said strip being hinged to a second strip, B′, so that the end of the latter shall, when the two strips are folded out to their utmost limit, bear against the under side of the strip B, the strip B′ being thus prevented from turning down to too great an extent. Both strips are of such a length that, when folded together and down on the face of the pan or plate A, they shall not extend beyond the limits of the rim $a$. The pans or plates generally carried by soldiers in the field are used both for cooking purposes and for eating from. As they are not provided with any handle, much inconvenience is experienced in placing them on or holding them over and detaching them from the fire. A permanent handle, like that of an ordinary frying-pan, would render the plates inconvenient to carry.

It will be seen that my improved plate, when the two strips are folded down to the position seen in Fig. 3, will occupy no more space than an ordinary army-pan, and that the strips, when folded out to the position seen in Fig. 4, form an appropriate handle—in other words, the utensil becomes a convenient and useful combination of a plate and frying-pan.

I claim as my invention and desire to secure by Letters Patent—

The pan or plate A, with its rim $a$, and the strips B and B′, when the latter are of such a length and are so hinged to each other and to the pan that they can be folded down and occupy a space within the limits of the rim $a$, as set forth, for the purpose specified.

In testimony whereof I have signed my name to this specification in the presence of two subscribing witnesses.

WILLIAM TERNESON.

Witnesses:
HENRY HOWSON,
JOHN WHITE.